United States Patent [19]

McColl

[11] Patent Number: 4,699,259
[45] Date of Patent: Oct. 13, 1987

[54] HYDRAULICALLY ACTUATED STARTING CLUTCH ASSEMBLY

[75] Inventor: John W. McColl, Broadview, Ill.

[73] Assignee: Borg-Warner Corporation, Chicago, Ill.

[21] Appl. No.: 685,684

[22] Filed: Dec. 24, 1984

[51] Int. Cl.⁴ .................. F16D 13/72; F16D 25/063
[52] U.S. Cl. .......................... 192/70.12; 192/85 AA; 192/103 F; 192/113 A
[58] Field of Search ............. 192/3.57, 85 AA, 70.12, 192/113 B, 113 A, 103 F; 474/18

[56] References Cited

U.S. PATENT DOCUMENTS

| | | | |
|---|---|---|---|
| 940,679 | 11/1909 | Evans | 192/70.28 R |
| 1,601,235 | 9/1926 | Bullard, Jr. et al. | 192/70.12 |
| 2,966,978 | 1/1961 | Kaptur | 192/106 F |
| 3,213,984 | 10/1965 | Cook | 192/85 AA X |
| 3,236,349 | 2/1966 | Wiggins et al. | 192/85 AA X |
| 3,552,534 | 1/1971 | Kern | 192/113 B |
| 3,747,731 | 7/1973 | Smirl | 192/104 R |
| 3,805,935 | 4/1974 | Armstrong | 192/113 A |
| 4,014,619 | 3/1977 | Good et al. | 403/359 |
| 4,315,565 | 2/1982 | Low | 192/113 B |
| 4,475,416 | 9/1984 | Underwood | 474/18 X |
| 4,520,912 | 6/1985 | Ferris et al. | 192/106 F X |

FOREIGN PATENT DOCUMENTS

| | | | |
|---|---|---|---|
| 223177 | 7/1959 | Australia | 192/89 B |
| 940405 | 10/1963 | United Kingdom | 192/85 AA |
| 1303816 | 1/1973 | United Kingdom | 192/113 B |

Primary Examiner—Leslie Braun
Assistant Examiner—David A. Testardi
Attorney, Agent, or Firm—James A. Geppert

[57] ABSTRACT

A hydraulically actuated starting clutch adapted for a continuously variable transmission which is located at the output of the transmission to couple the vehicle wheels to the engine upon a signal from the throttle induced system oil pressure. The clutch includes a cover connected to the drive shaft through a hub forming a pressure chamber behind a piston, a Belleville spring acted upon by the piston and urging a pressure plate against the clutch plate and an end plate secured in the cover. Weights are mounted on the Belleville spring to compensate for the centrifugal effect of the oil in the pressure chamber, and a cooling oil impeller is positioned between the end plate and a clutch plate hub and operatively connected to the end plate. The Belleville spring bears on the hub and cover to retain them in operative driving condition, and the clutch plate is operatively connected to a sleeve shaft to drive the differential for the vehicle wheels. Also, the hydraulic pressure acting on the secondary pulley of the continuously variable transmission to change its effective diameter simultaneously acts on the piston actuating the clutch.

7 Claims, 6 Drawing Figures

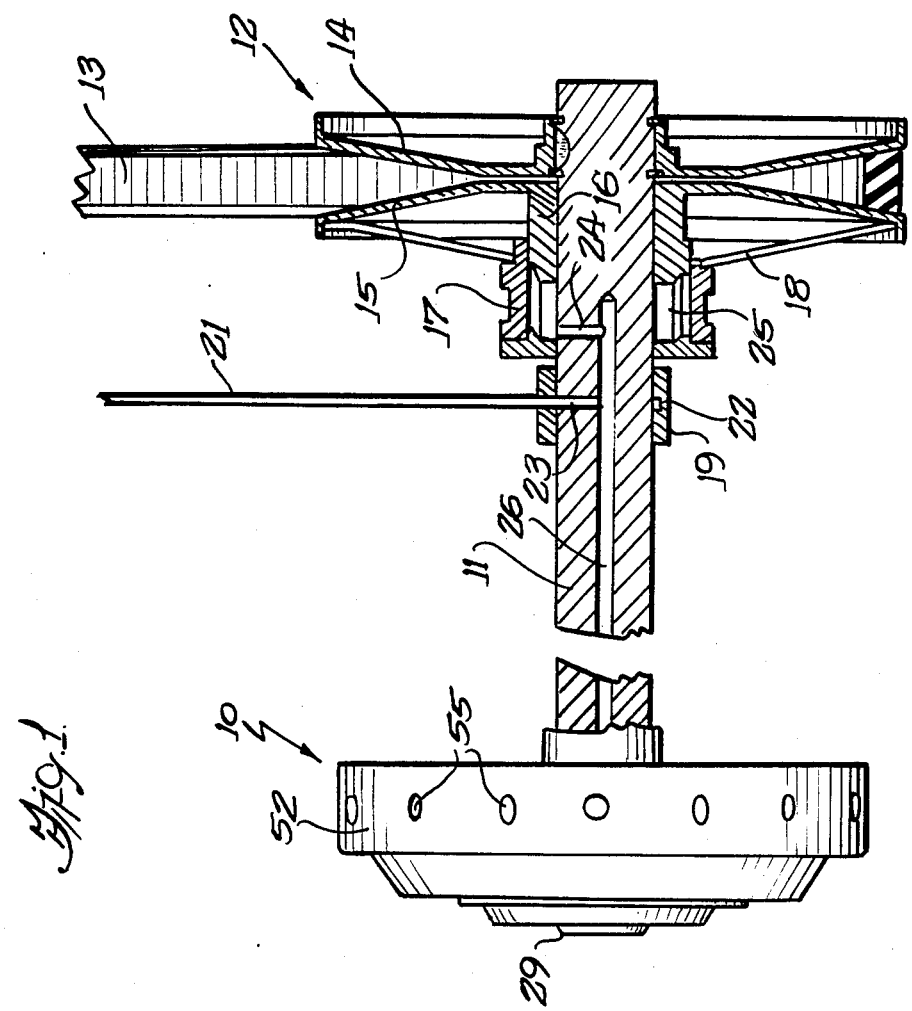

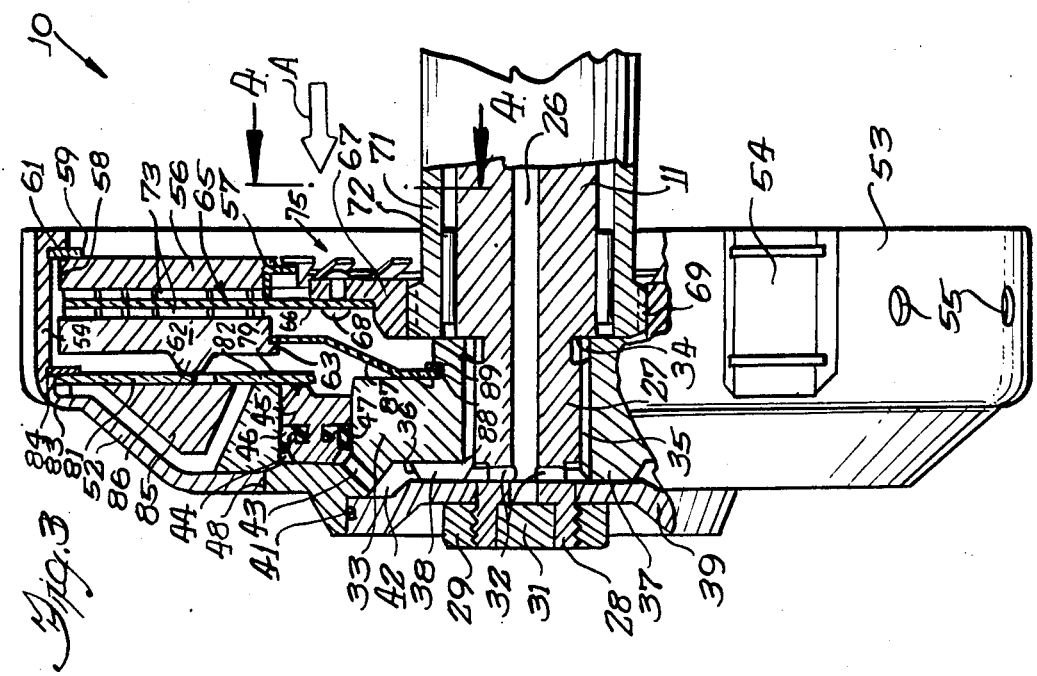
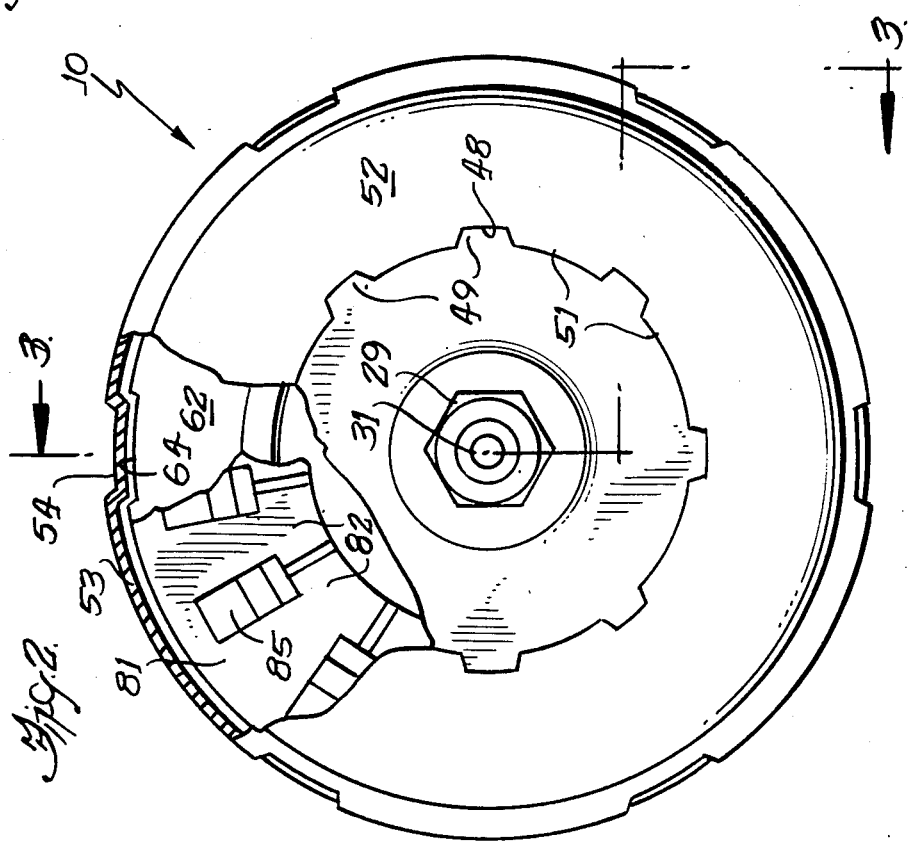

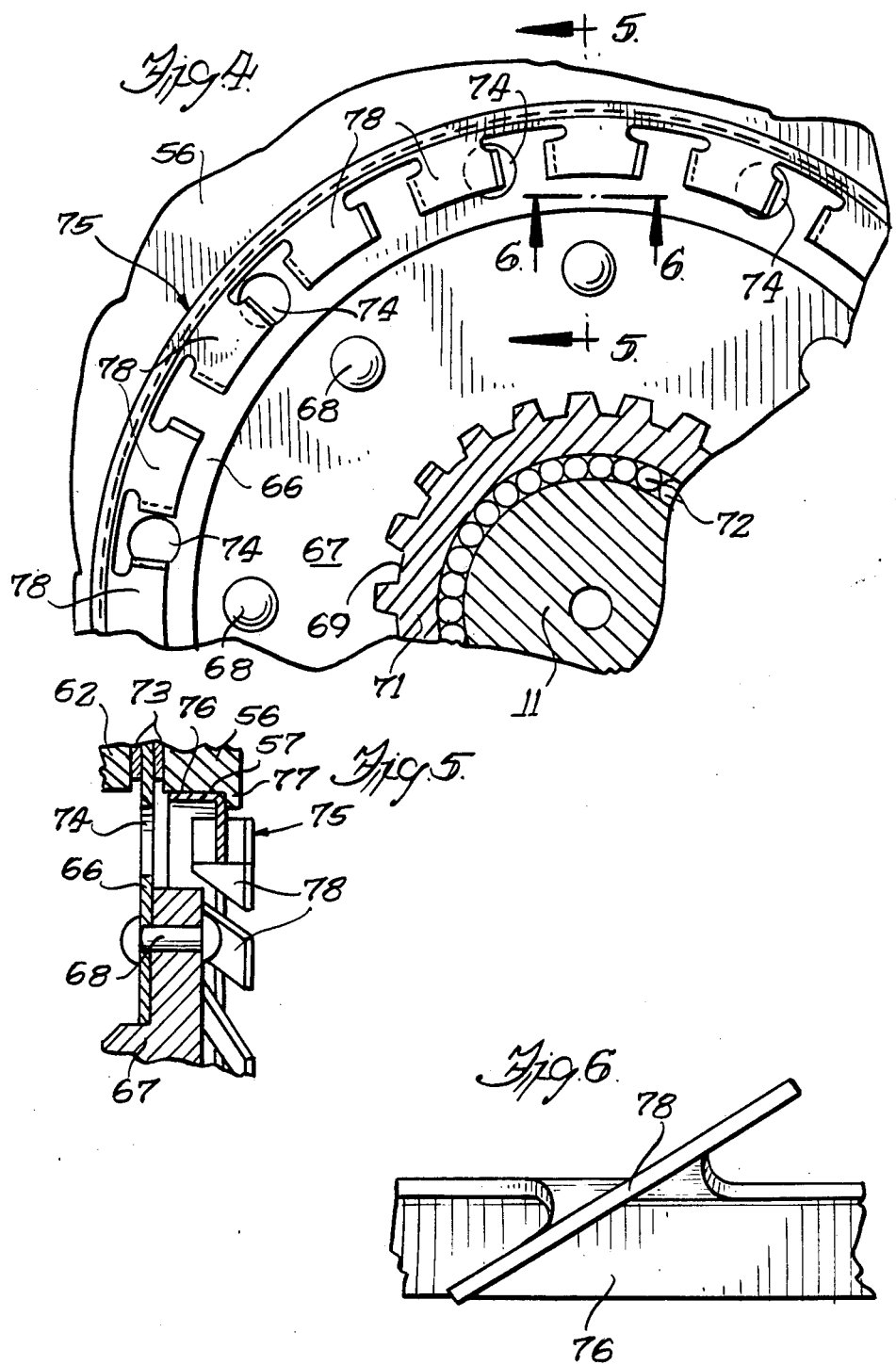

HYDRAULICALLY ACTUATED STARTING CLUTCH ASSEMBLY

BACKGROUND OF THE INVENTION

The present invention relates to a hydraulically actuated starting clutch, and more specifically to a starting clutch assembly for a continuously variable transmission in an automotive vehicle. Continuously variable transmissions have been known for several years as a driving assembly between a vehicle engine and the road engaging wheels to provide a smooth acceleration without the usual gear shifting found in most automatic transmissions. A continuously variable transmission includes a pair of variable sheave pulleys, an endless belt extending between and engaging the pulleys, and control means to alter the effective pulley diameters and thus change the belt ratio.

In automotive applications, it is necessary to incorporate a suitable clutch assembly in the drivetrain as a starting device and planetary gearing to effect desirable gear reduction and to provide for forward-neutral-reverse gear mechanisms. It is desirable to have the pulleys constantly rotating when the vehicle engine is running, even at an idle rpm, so that initiation of the vehicle movement is accomplished by a speed responsive friction starting device, such as a clutch, located at the output of the transmission, and a forward-neutral-reverse mechanism is desirably located in conjunction with or subsequent to the starting device.

In a starting clutch where actuation is dependent upon hydraulic pressure acting on the clutch engaging elements, and where circulating oil is utilized for cooling of the friction faces, the viscous drag resulting from the oil flowing between the clutch surfaces when the clutch is in its released state results in a condition where the clutch is not fully disengaged. Therefore, unwanted driving input to the transmission is present after release of the clutch. The undesirable vehicle "creep" that results often requires the use of a special brake in the system; an inefficient and costly extra. A possible solution to this problem is the strategic dumping of the cooling oil flowing to the clutch together with the clutch's ability to promptly respond.

Another problem resides in the resultant centrifugal force of a rotating clutch which provides liquid pressure that may influence actuation of the clutch piston in its chamber. Further problems include engine stalling during rapid vehicle braking and lack of smoothness of clutch engagement during acceleration of the vehicle. The present invention overcomes these various problems in the form of a novel hydraulically actuated starting clutch assembly.

SUMMARY OF THE INVENTION

The present invention comprehends the provision of a novel starting clutch arrangement, particularly for a continuously variable transmission, which is located at the output of the transmission to automatically couple the vehicle engine to the driving wheels upon a signal from the throttle induced system oil pressure. Where no throttle signal is present, the clutch will substantially completely disengage to prevent vehicle creep due to viscous drag resulting from the cooling fluid present between the clutch engaging surfaces. A fluid impeller is positioned on a continuously rotating member adjacent the clutch plate to break up and disburse the cooling fluid to the clutch surfaces, especially where there is a locked-wheel stall condition so that the clutch plate is stationary.

The present invention also comprehends the provision of a starting clutch in the form of a hydraulically-operated wet clutch including a Belleville spring to multiply the hydraulic force of the piston to be exerted on the clutch pressure plate. Also, the Belleville spring carries centrifugal weights thereon to cancel the unwanted effects of hydraulic centrifugal "head" in the assembly at speeds of the order of 12,000 rpm. The force of the Belleville spring causes the inner ends of the spring fingers to bear against the clutch driving hub and the outer edge of the spring to bear against the clutch cover to retain the hub and cover in their operative assembled condition. A retractor spring is positioned between the clutch hub and pressure plate to aid in disengaging the clutch when hydraulic pressure is reduced.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a view partly in elevation and partly in cross section of the starting clutch of the present invention on the driving shaft of the secondary pulley of a continuously variable transmission.

FIG. 2 is a front elevational view of the starting clutch of the present invention with portions broken away to show the internal clutch structure.

FIG. 3 is a partial cross sectional view of the clutch taken on the irregular line 3—3 of FIG. 2.

FIG. 4 is an enlarged partial rear elevational view taken on the line 4—4 of FIG. 3.

FIG. 5 is a partial cross sectional view taken on the line 5—5 of FIG. 4.

FIG. 6 is a partial cross sectional view taken on the line 6—6 of FIG. 4.

DESCRIPTION OF PREFERRED EMBODIMENT

Referring more particularly to the disclosure in the drawings wherein is shown an illustrative embodiment of the present invention, FIGS. 1, 2 and 3 disclose a hydraulically-actuated starting wet clutch 10 mounted on a driving secondary shaft 11 from a continuously variable transmission, such as illustrated in U.S. Pat. No. 4,241,618. The transmission includes a primary adjustable pulley (not shown) and an adjustable secondary pulley 12 interconnected by a suitable drive belt 13. The pulley 12 comprises a stationary side 14 and an axially movable side 15 on the shaft 11; the movable side including an annular piston 16 acting within a hydraulic cylinder 17 mounted on the shaft. A disc spring 18 is positioned between the cylinder 17 and the movable flange 15. A non-rotatable delivery sleeve 19 is mounted on the shaft and communicates with a hydraulic fluid source by conduit 21. The sleeve includes an inner annular groove 22 communicating with conduit 21 and a transverse bore 23 in the shaft; a second transverse bore 24 communicating with the chamber 25 formed in the cylinder 17. A longitudinal bore 26 in shaft 11 extends from a stepped end portion 27 of the shaft in the wet clutch 10 and communicates with transverse bores 23 and 24.

The stepped portion 27 terminates in a reduced threaded end 28 receiving an internally threaded nut 29; the shaft passage 26 being plugged at 31 and communicating with a plurality of generally radial feed holes or passages 32. A substantially annular hub 33 is received on the reduced end portion 28 abutting the shoulder 34 defining the end portion and secured by splined connection 35 to rotate with the constantly rotating driving shaft. The hub face is provided with an annular projection 37 in a central recess 36 with a plurality of radial passages 38 formed in the surface of the projection receiving fluid from the passages 32. An annular cap 39 is received on the end 28 within the recess 36 to abut the projection 37 and form a portion of the passages 38; the cap having a peripheral sealing ring 41 engaging the periphery of recess 36 and defining an annular chamber 42 in the recess. The nut 29 urges the cap 39 against the hub and likewise urges the hub against the shoulder 34. A plurality of angular passages 43 communicate between the chamber 42 and an annular pressure chamber 44 accommodating an axially movable annular piston 45. The piston includes inner and outer annular resilient lip seals 46 and 47 engaging the walls of the pressure chamber 44. On the outer face of the hub opposite to the chamber 44 is an annular shoulder 48 having teeth 49 (FIG. 2) formed thereon receiving complementary teeth 51 on the inner edge of a clutch housing or cover 52 to form a rotary connection therebetween. The cover has an outer axially extending flange 53 provided with internal flattened ribs 54 (FIG. 2), and openings 55 are provided in the cover flange to allow outward flow of cooling fluid therefrom.

An end plate 56 has an inner lipped surface 57 and an outer periphery with axial channels or grooves 58 (FIG. 3) formed therein to receive the indented ribs 54 so as to rotate with the cover. A snap ring 59 is positioned in an annular groove 61 in the cover flange 53 and ribs 54 to retain the end plate in the cover. Also, an axially movable annular pressure plate 62 has an inner lip 63 and outer periphery has axial channels 64 (FIG. 2) formed therein receiving the ribs 54. Between the end plate 56 and the pressure plate 62 is positioned a clutch plate 65 having a core plate 66 secured to a powdered metal hub 67 through rivets 68 received in aligned openings in the core plate and hub. The hub 67 is internally splined at 69 to receive the splined end of a sleeve or driven shaft 71 encompassing the shaft 11 and rotatably mounted on bearings 72; the sleeve shaft 71 acting to drive the vehicle wheels through a suitable differential (not shown).

The clutch plate includes a pair of oppositely disposed friction facings 73,73 formed preferably of a non-asbestos material having a high cofficient or friction that is adhesively bonded to the core plate 66. The facings are provided with waffle grooving and feeder slots cut into the lining to allow for efficient cooling oil flow through the clutch grooves at low back pressure. The cooling oil can flow through perforations 74 (FIG. 5) in the core plate 66 so as to cool both surfaces of the clutch plate. Oil is encouraged to flow into the clutch assembly (arrow A) by an impeller 75 having an axial flange 76 received on the lipped surface 57 of the end plate 56 and positioned by the lip 77. The impeller is provided with a plurality of radially inwardly extending angled vanes 78 (see FIGS. 4, 5 and 6).

The face of the piston 45 has an annular fulcrum surface 79 engaging the inner ends of the fingers 82 of a Belleville spring 81. The periphery of the spring is positioned between a shoulder 83 formed in the corner of the cover 52 and a second snap ring 84 received in a groove in the cover to provide a fulcrum surface for the spring. Centrifugal weights 85 are mounted in circumferentially spaced slots between the fingers 82 of the Belleville spring for a purpose to be later described. As seen in FIG. 3, the over-center position of the Belleville spring 81 causes the inner ends of the fingers 82 to act against the piston 45 causing retraction thereof and acts against the hub to urge it to the left. Simultaneously, the outer edge of the spring acts against the snap ring 84 to urge the cover 52 to the right. Thus the reactive forces of the spring 81 acts to continuously retain the hub and cover together without the benefit of additional securing means.

The surface of the pressure plate 62 facing the Belleville spring 81 has an intermediate annular fulcrum ridge 86 to engage the approximate mid-point of the Belleville spring 81 between the inner ends of fingers 82 and the periphery thereof. Also, a retractor disc 87, formed of a resilient material has its inner diameter 88 received in an annular groove in the hub 33 (FIG. 3) and its periphery engaging the lip 63 of the pressure plate 62; a snap ring 89 retaining the retractor disc on the hub 33. The retractor spring is of a configuration that it prevents almost all of the cooling oil from passing beyond it into the front of the clutch where it will achieve no useful purpose.

Hydraulic fluid under pressure is supplied from a throttle-induced pump (not shown) in the vehicle drive system through the conduit 21 (see FIG. 1) extending into the sleeve 19 and communicating with the passage 26 to both actuate the pulley side 15 and the piston 45 in pressure chamber 44. Also, the complete assembly 10 has a housing (not shown) encompassing the assembly, and a source of cooling fluid (oil) is available at the righthand end of the assembly as shown by arrow A in FIG. 3 to cool the friction surfaces of the clutch plate, pressure plate and end plate; the pressure plate 62 and end plate 56 both being relatively thick to provide an adequate heat sink to handle short but high-powered clutch engagements. As the variable transmission pulleys are accelerated from idle rpm, the fluid pump increases the hydraulic pressure applied through conduit 21 and bore 26 to change the effective diameter of the pulley and through passages 32, 38 and 43 to the pressure chamber 44 to urge the piston 45 to the right, as seen in FIG. 3, to engage and actuate the fingers 82 of the Belleville spring 81. The spring pivots at the shoulder 83 and snap ring 84 and delivers force through the fulcrum 86 of the pressure plate 62 to urge the pressure plate towards the friction clutch plate 65 to engage the end plate 56 and cause rotation of the sleeve shaft 71 to drive the vehicle wheels upon being coupled to rotation of the driving shaft 11.

The Belleville spring is so proportioned as to prevent clutch engagement until a predetermined piston pressure is developed as a consequence of throttle advance; which system allows for "clunk-free" shifts from neutral to drive and from neutral to reverse. The spring rate of the Belleville spring has been set so that 8 psi. of throttle pressure increase is required to get the piston from full "off" position to "just causing torque" position. This is to guarantee clean and responsive slow speed vehicle maneuvering in garages and in parking sequences. The centrifugal weights 85 mounted in the spring slots not only allow the clutch to be disengaged at high speeds, when necessary, but prevent medium speed hydraulic "head" in the apply cylinder 44 from spoiling the proper linear relationship of clutch torque versus secondary sheave torque. It is difficult to keep the clutch capacity in its proper relationship to the transmission belt capacity for the pulleys if centrifugal hydraulic forces are allowed to interfere. The continuous compensation provided by the weighted Belleville spring enables the clutch to function as a "fuse" in a precise way.

The Belleville spring serves the following functions:
(1) It acts as a return spring.
(2) It multiplies the piston force by a factor of approximately 2 to 1.
(3) It imposes the clutch engaging force at about the radial mid-point of the friction members.
(4) It provides for a cushioning effect during clutch engagement enhancing shift smoothness due to the springiness of the spring fingers.
(5) It retains the hub and cover together.

When the operator releases the throttle during operation of the vehicle, the hydraulic pressure rapidly decreases and the Belleville spring 81, in conjunction with the retractor disc 87, acts to retract the pressure plate 62 and the piston 45 and disengage the clutch plate sufficiently cleanly to minimize open clutch drag and vehicle creep. Located on the secondary (output) shaft 11, the clutch is so sized as to always slip before the belt can slip. The clutch is supplied with fluid pressure through the bore 26 in the secondary shaft 11 with the oil at secondary sheave pressure; thus it is always "aware" of the secondary sheave's condition.

The small impeller 75 has been installed in the annular space between the inner diameter of end plate 56 and the friction clutch hub 67 to encourage the influx of cooling oil during locked-wheel stall. When this stall maneuver occurs, the wheels are locked, which means the friction plate is not rotating, although the shaft 11, hub 33, cover 52, end plate 56 and pressure plate 62 continue to rotate. The cooling oil jet may well be striking a space between core plate holes 74 and not only failing to get to the far side of the friction plate, but rebounding so vigorously that the oil doesn't even cool the near side of the friction plate. As the impeller 75 is still rotating although the clutch plate is stationary, the cooling oil strikes the impeller vanes 78 and is broken up and disbursed on both sides of the clutch plate 65 to flow past the friction surfaces through the grooves therein and cool the clutch plate, end plate and pressure plate.

Although shown and described as a starting clutch for a continuously variable transmission, it is obvious that this clutch can be utilized in other transmission arrangements where a starting clutch is necessary or desirable.

I claim:

1. A starting clutch adapted to engage upon a signal from a throttle induced system oil pressure to couple a constantly rotating driving shaft with a driven concentric sleeve shaft, comprising a first hub rotatable with said driving shaft, a clutch cover operatively connected to said hub and having an axial flange portion, said hub having an annular pressure chamber formed therein receiving an axially reciprocable annular piston, a clutch plate carrying friction facings, a second hub rotatable with said sleeve shaft and secured to the clutch plate, an end plate operatively connected to rotate with said axial flange portion, an axially reciprocable pressure plate operatively connected to rotate with said axial flange portion, a Belleville spring pivotally mounted in said cover and directly actuated by said piston to engage said pressure plate and urge it against the clutch plate located between the pressure plate and end plate, means to counterbalance the centrifugal force of the hydraulic fluid in the pressure chamber, a retractor disc operatively connected at its inner periphery to said first annular hub and at its outer periphery to a lip on the inner diameter of the pressure plate, a source of cooling fluid for the clutch, an impeller mounted within the inner diameter of said end plate to rotate therewith and direct the flow of cooling oil to the clutch plate surfaces, said impeller including an axial flange engaging said end plate and a plurality of radially inwardly extending angled vanes in the annular spacing between the end plate and the second hub, and a source of hydraulic pressure communicating with said pressure chamber.

2. A starting clutch as set forth in claim 1, in which indented flattened ribs are formed in the axial flange portion circumferentially spaced therearound, and said pressure plate and end plate have complementary flattened channels in the peripheries thereof conformably receiving said ribs.

3. A starting clutch as set forth in claim 2, including a snap ring received in a groove adjacent the outer end of the cover flange to retain the end plate therein.

4. A starting clutch as set forth in claim 1, in which said cover has a corner at an inner end of the axial flange, and a snap ring is located in a groove spaced from said corner, the periphery of said Belleville spring being located between the corner and snap ring and fulcrumed therebetween.

5. A starting clutch as set forth in claim 1, wherein said first hub and inner periphery of said clutch cover have complementary teeth interengaging to form a rotary connection therebetween.

6. A starting clutch adapted to engage upon a signal from a throttle induced system oil pressure to couple a constantly rotating driving shaft with a concentric driven sleeve shaft, comprising a first hub rotatable with said driving shaft, a clutch cover mounted on said first hub and having an axial flange portion, means drivingly connecting said first hub and cover, said first hub having an annular pressure chamber formed therein receiving an axially reciprocable annular piston, a clutch plate carrying friction facings, a second hub rotatable with said sleeve shaft and secured to the clutch plate, an end plate operatively connected to rotate with said axial flange portion, an axially reciprocable pressure plate operatively connected to rotate with said axial flange portion, a Belleville spring pivotally mounted in said cover and directly actuated by said piston to engage said pressure plate and urge it against the clutch plate located between the pressure plate and end plate, said cover having a corner at an inner end of the axial flange, and a snap ring located in a groove spaced from said corner, the periphery of said Belleville spring being located and fulcrumed between the corner and snap ring, said Belleville spring including inwardly extending spring fingers having inner ends, the inner ends and the outer spring periphery bearing on said first hub and cover snap ring, respectively, acting to retain the first hub and cover assembled.

7. A starting clutch as set forth in claim 6, wherein said driving connecting means comprises circumferentially spaced teeth on said first hub interengaging with complementary teeth on the inner edge of the cover.

* * * * *